United States Patent

Ishimaru

[11] Patent Number: 5,982,931
[45] Date of Patent: *Nov. 9, 1999

[54] APPARATUS AND METHOD FOR THE MANIPULATION OF IMAGE CONTAINING DOCUMENTS

[76] Inventor: Mikio Ishimaru, 1046 Pinenut, Sunnyvale, Calif. 94087

[*] Notice: This patent issued on a continued prosecution application filed under 37 CFR 1.53(d), and is subject to the twenty year patent term provisions of 35 U.S.C. 154(a)(2).

[21] Appl. No.: 08/980,230

[22] Filed: Nov. 28, 1997

Related U.S. Application Data

[63] Continuation of application No. 08/487,330, Jun. 7, 1995, abandoned.

[51] Int. Cl.[6] .............................. G06K 9/68; G06K 9/36; G06K 9/32
[52] U.S. Cl. .......................... 382/218; 382/219; 382/284; 382/294
[58] Field of Search .................................... 382/181, 217, 382/218, 219, 220, 222, 284, 294, 298, 300, 309; 379/100.13

[56] References Cited

U.S. PATENT DOCUMENTS

| 4,651,341 | 3/1987 | Nakashima et al. | 382/222 |
| 4,887,304 | 12/1989 | Terzian | 382/221 |
| 4,996,707 | 2/1991 | O'Malley et al. | 379/100.13 |
| 5,251,265 | 10/1993 | Döhle et al. | 382/123 |
| 5,386,508 | 1/1995 | Itonori et al. | 395/161 |
| 5,438,628 | 8/1995 | Spitz et al. | 382/181 |
| 5,524,071 | 6/1996 | Yokomizo | 382/284 |
| 5,576,732 | 11/1996 | Minakuchi et al. | 345/127 |

*Primary Examiner*—Bipin Shalwala
*Attorney, Agent, or Firm*—McDermott, Will & Emery; Mikio Ishimaru

[57] ABSTRACT

An apparatus and method for manipulating a referenced document and a searched document containing images and descriptive text. The manipulation includes conversion of images and text into equivalent images which are standardized by utilizing predetermined design rules. The images are then compared and analyzed to determine similarities, partial similarities, and dissimilarities.

52 Claims, 3 Drawing Sheets

APPARATUS AND METHOD FOR THE MANIPULATION OF IMAGE CONTAINING DOCUMENTS

This application is a continuation of application Ser. No. 08/487,330 filed Jun. 7, 1995 now abandoned.

TECHNICAL FIELD

The present invention relates generally to processing documents, and more specifically to machine implemented comparison of documents containing images with or without accompanying text.

BACKGROUND ART

In the past, while it has been possible to find exact copies of images or text in hard copy or electronic documents using computerized systems, it has not been possible to find copies of similar images or text where there have been significant differences in format or configuration. For example, it has not been possible to start with a drawing to find similar or different drawings, start with a text description of a drawing to find similar or different drawings, start with a drawing to find similar or different text descriptions, or start with a text description of a drawing to find similar or different text descriptions.

An illustration of where a system with such capabilities would be desirable is evident in both domestic and foreign patent law practice. Since the founding of various patent offices, highly skilled patent examiners, patent practice attorneys, and patent agents had to go through a time consuming process of visually studying patents, patent applications, and other technical documents as part of their job. Often, extensive visual comparisons had to be made along with complex interpretations of text.

Recently, this time consuming process has been expedited by developing computerized word searches where word strings or individual words are located in various documents. However, even with this procedure, the number of documents which still must be individually reviewed for visual, textual, and technical similarity is huge.

Although there are a number of different functions that need to be performed, there are generally six functions in which some type of visual image and text comparison mechanism has long been desired. These functions are: patent design around; validity/prior art search; response to office action; infringement determination; patent drafting; and clearance search.

In patent design around, a particular design is duplicated using expired, abandoned, or unenforced patents or other prior art which permits the avoidance of the patent claims. This is usually done when there is a troublesome patent and a product is in an early stage of design where changes can easily be implemented.

In a validity/prior art search, the claims of a patent or patent application are used to find prior art earlier than a specific statutory period which would invalidate the claims. This is generally done in the patent office when rejecting patent application claims and by patent attorneys when seeking to invalidate a patent which is involved in litigation.

In a response to office action, the claims in a patent application are compared to the references cited by a patent examiner to determine differences between the claims and the cited prior art so the patent application claims can be distinguished, modified, or abandoned.

In infringement determinations, the patent claims are read on a device to determine whether infringement exists. In some cases, the device is described by many drawings and/or many components which make it difficult to tell whether or not the patent claims read directly on the device. Due to the complexity of a device with many drawings involved, it is highly desirable to be able to tell quickly and easily when the patent claims read on the device and thus when infringement actually exists.

In patent drafting, there are usually drawings of an invention and it would be desirable to find similar patents or patent applications from which images or text could be imported to create a new patent application. Generally, this tends to be the most complex of tasks, and often the value of the patent is only determined by the degree of expertise of the patent attorney or patent agent involved in drafting the patent application.

In a clearance search, the drawings of a new device or manufacturing method are used to find patents which claims the device will potentially infringe. Generally, this is done for a client who wishes to make sure there will be no patent infringement by a new product or process it wishes to make, use, or sell. It is probably the most time consuming, and thus most expensive, function which can be performed because it requires the claims of many patents to be interpreted carefully against the product or process.

While there have been a long sought need over hundreds of years and considerable investment in trying to improve the above system and provide the above functions, no comprehensive solution has appeared. This is despite the high degree of skill and technology which has been applied to the various problems presented.

DISCLOSURE OF THE INVENTION

The present invention provides a system of taking information in either image or text form, manipulating the information to provide images for comparison, and outputting information on similarities, dissimilarities, and combined similarities of text and images.

One advantage of the present invention is in automating at least a part of the capability of performing a patent design around function.

Another advantage of the present invention is in automating at least a part of the capability of providing validity/prior art searches.

Another advantage of the present invention is in automating at least a part of the capability of providing responses to office actions.

Another advantage of the present invention is in automating at least a part of the capability of providing infringement determinations.

Still another advantage of the present invention is in automating at least a part of the capability of providing patent drafting.

A further advantage of the present invention is in automating at least a part of the capability of providing clearance searches.

The above and additional advantages of the present invention will become apparent to those skilled in the art from a reading of the following detailed description when taken in conjunction with the accompanying drawings.

BEST MODE FOR CARRYING OUT THE INVENTION

The invention achieves the above and other advantages at least in part by reading and storing images to be compared, converting them to a similar format, comparing, and producing an output indicative of the result of the comparison. When text is included, the text is converted to a format compatible image for comparison.

Figure 1:
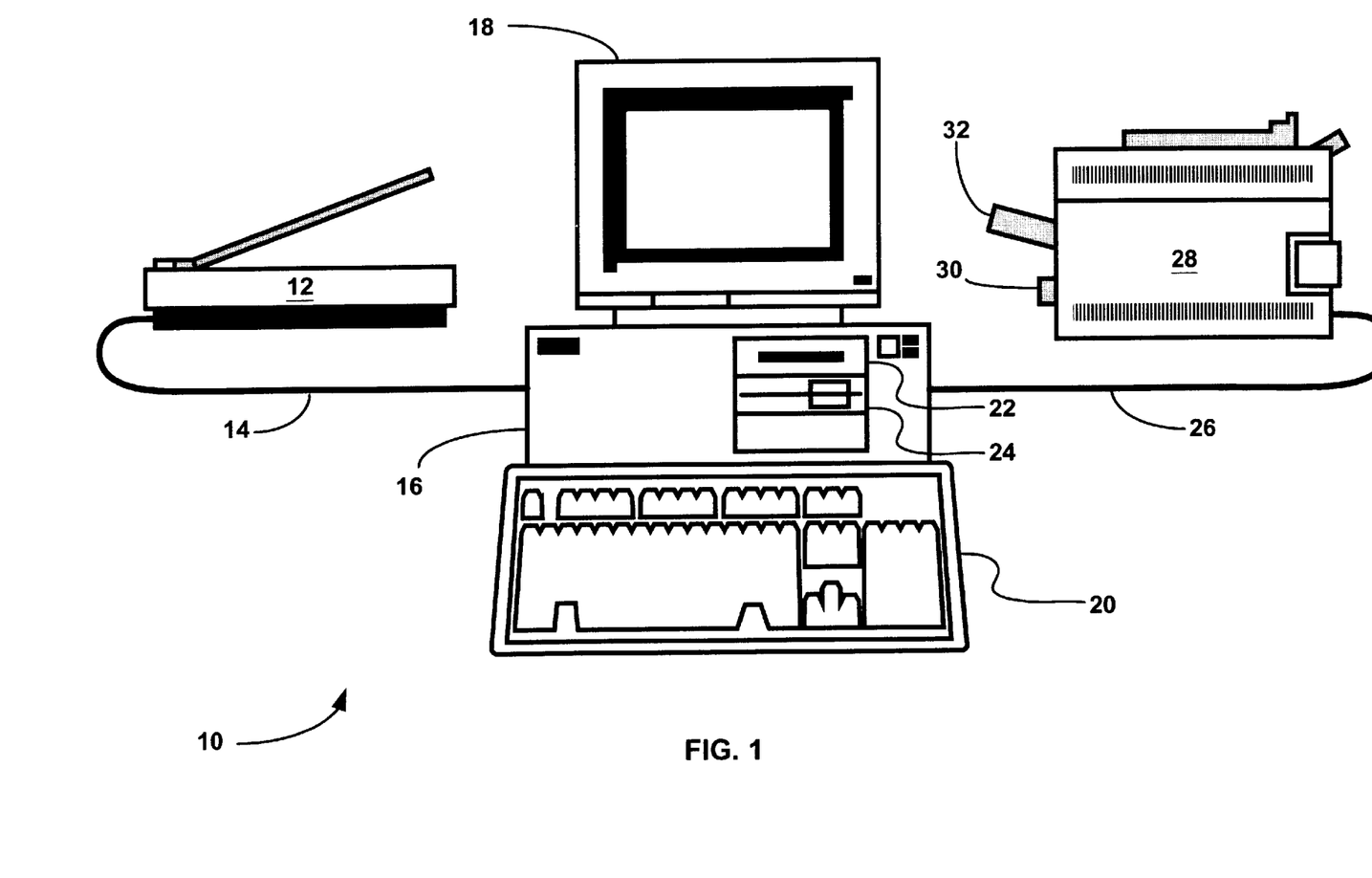
FIG. 1 is an overview of the apparatus which forms the preferred embodiment of the present invention.

Referring now to FIG. 1, therein is shown a document processing system 10 in which the invention is implemented. It should be understood that "document" is used in the generic sense because the system 10 can accommodate hard copies of drawings, pictures, schematics, reports, books, etc. as well as soft copy electronic equivalents such as 3-D computer aided design and manufacturing data, spread sheets, etc. Similarly, it should be understood that "processing" is also used in the generic sense in that any type of image and text manipulation is encompassed as well as electronic manipulation of documents.

The system 10 includes a document input mechanism 12 which is shown as a conventional scanner in the preferred embodiment although it may be any type of electronic or optical information entry device. The document input mechanism 12 is connected by a cable 14 to a processing unit 16. The processing unit 16 may be any type of general purpose computer, programmable data processor, personal computer, or workstation. In the preferred embodiment, the processing unit 16 is shown as a workstation having an output display CRT 18 and a keyboard 20. The processing unit also has a CD-ROM drive 22 and a floppy and hard disk drive 24 for the input of documents or information.

The processing unit 16 is connected by a cable 26 to a document output mechanism 28. In the preferred embodiment the document output mechanism 28 is a printer having a paper tray 30 and a paper output 32.

As would be evident to those skilled in the art, input can be provided through the document input mechanism 12, the keyboard 20, the CD-ROM drive 22, or the floppy and hard disk drive 24. Similarly, the output can be through the CRT 18, the CD-ROM drive 22, the floppy and hard disk drive 24, as well as the output mechanism 28.

The system 10 in the preferred embodiment is intended to be utilized as an aid in providing the patent law practice related functions, but there are many other areas in which the system 10 can be used for other manipulation of different sorts of image and textual documents.

Figure 2:
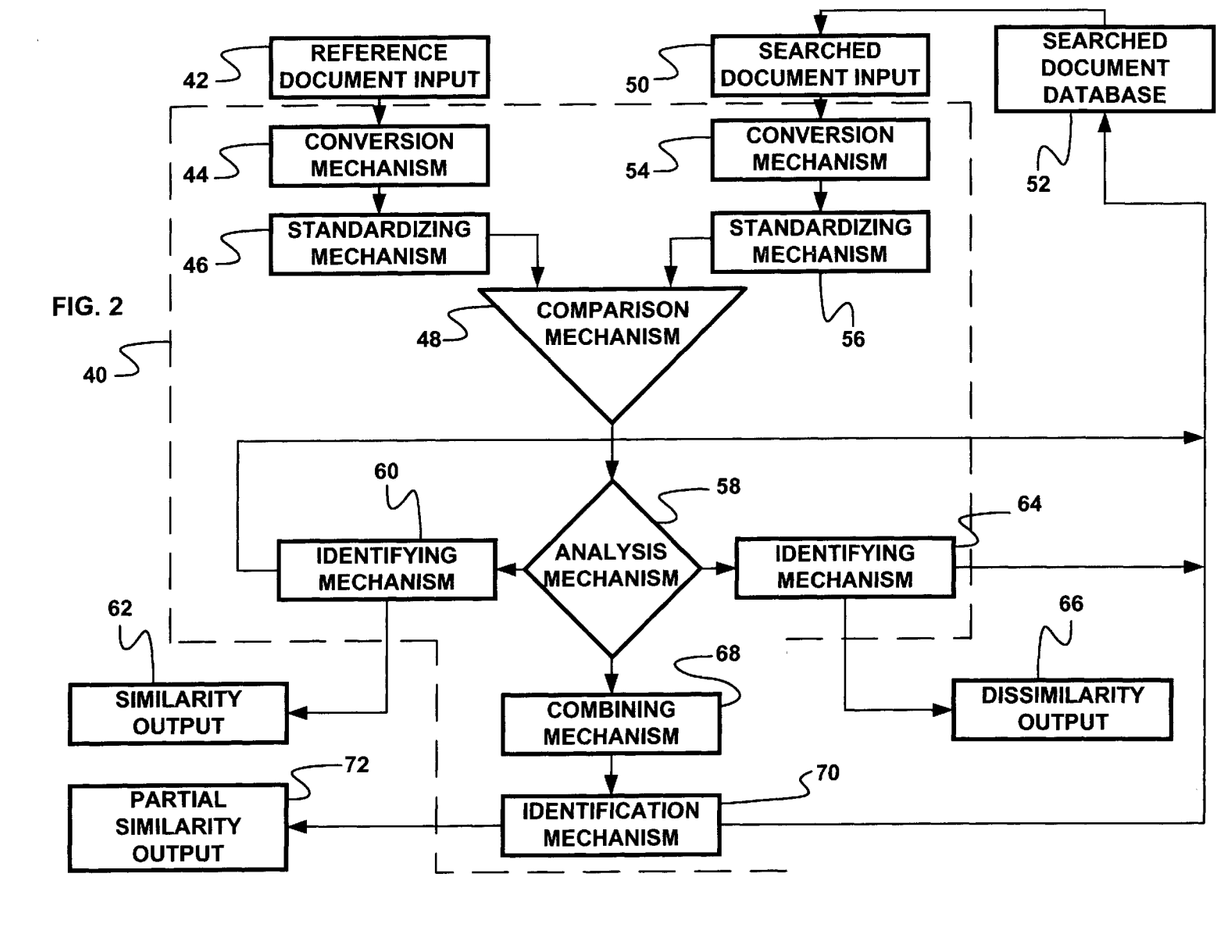
FIG. 2 is a block diagram of the overall method of the present invention.

Referring now to FIG. 2, therein is shown a block diagram of a computer program 40, stored in a machine-readable medium, such as a diskette or other form of internal or external memory, which performs a method of manipulation implemented in accord with the invention, in the processing unit 16. The computer program 40 has a reference document input 42 provided with an image and/or text (such as a block diagram or written description) as previously described from the document input mechanism 12. Generally, the text will be related to the image in the document.

The reference document input 42 provides an input to the conversion mechanism 44. The conversion mechanism 44 (where "mechanism" is used in the processing sense, although a configurable processor could also perform this function) preferably is a simple lookup table subroutine connected to a database. The conversion mechanism 44 makes format changes such as changing a text description of a document into a text equivalent image as hereinafter described. Similarly, as hereinafter described, the conversion mechanism 44 contains a thesaurus for finding synonyms for technical terms and their image equivalents.

The output of the conversion mechanism 44 is inputted into a standardizing mechanism 46 which manipulates the image provided to conform to a set of predetermined rules and layout. One typical set may be that used conventionally in computer aided design (CAD) systems. For example, one rule may be that an electrical image will start at a power source and end in a ground.

The output of the standardizing mechanism 46 is provided as one input to a comparison mechanism 48 which is a subroutine for comparing images conforming to the same set of standardized rules. Bit-mapped or other graphic file format matching subroutines can be used for the comparison mechanism 48, or a modified version of the image repositioning and analysis approach described by the paper "A Model-Based Layout Understanding Method For Document Images" by Yamashita and Amano in the Transactions of the Institute of Electronics, Information and Communication Engineers D-II, vol. J75-D-II, No. 10., pp. 1673–81, October 1992, incorporated herein by reference.

The other input to the standardizing mechanism 46 starts at a searched document input 50 which in the preferred embodiment has information provided from the CD-ROM drive 22 or the floppy and hard disk drive 24 into which the database CD-ROM or floppy disk containing a searched document database 52 is inserted.

The output of the searched document input 50 is inputted into a conversion mechanism 54 which is the same as the conversion mechanism 44. For ease of explanation, the conversion mechanisms 44 and 54 are shown separately although it will be understood by those skilled in the art that it could be the same subroutine.

The output of the conversion mechanism 54 is inputted into a standardizing mechanism 56 which is similar to the standardizing mechanism 46. Again, for ease of explanation these are shown as two separate subroutines although they could both be the same subroutine.

Further, it should be understood that the processing unit 16 could be a multiprocessor in which case a plurality of simultaneously used conversion and standardizing mechanisms or subroutines are preferred if there are a large number of documents to be searched in the searched document database 52.

The standardizing mechanism 56 provides its output as the second input to the comparison mechanism 48.

The output of the comparison mechanism 48 provides an input to an analysis mechanism 58 for determination of the degree of similarity, dissimilarity, or portion of similarity of the images inputted into the comparison mechanism 48. While the analysis mechanism 58 is shown as being separate from the comparison mechanism 48, it is shown separately for purposes of explanation. The analysis mechanism 58 could be as simple as determining total identity of images as searched by the QBIC (Query By Image Content) software program developed at IBM's Almaden Research Center in San Jose, Calif., and sold by IBM Corporation. Alternatively, the analysis mechanism 58 may be a fuzzy logic subroutine capable of determining degrees of similarity and dissimilarity.

The output of the analysis mechanism 58 for similar images is inputted to an identifying mechanism 60 for identifying the searched document which is similar to the reference document and providing an indication thereof to the similarity output 62. This indication could also be an image of the searched document highlighted to show the similarity or a text equivalent of the similar image.

Another output of the analysis mechanism 58 for dissimilar images is inputted to the identifying mechanism 64 which is similar to the identifying mechanism 60. The identifying mechanism 64 outputs both the identity of the dissimilar document as well as identifies that portion of the image which is dissimilar. For example, the title could be identified for a paper or a drawing number for a part. In addition, for large drawings, the location of a portion would be identified by a predetermined coordinate system.

The output of the identifying mechanism 64 is inputted to the dissimilarity output 66.

A third output of the analysis mechanism 58 is inputted to the combining mechanism 68. This would be a simple combinatorial subroutine which would be evident to those skilled in the art for taking similar images or images which have portions which are similar to the reference document image and combining them together in different combinations for feedback to the comparison mechanism 48 to try to get a closer degree of similarity which would be outputted to the similarity output 62.

The combining mechanism 68 provides its output to the input of an identification mechanism 70 which is similar to the identifying mechanisms 60 and 64. The document images identified by identification mechanism 70 are those which were found to be similar in portion to the image in the reference document but which can not be combined to be sufficiently similar to be outputted to the similarity output 62. The output of the identification mechanism 70 is provided to the partial similarity output 72.

The identifying mechanisms 60, 64, and 70 are all connected to the searched document database 52 to indicate when a comparison has been completed and the program is ready for the next searched document.

Figure 3:
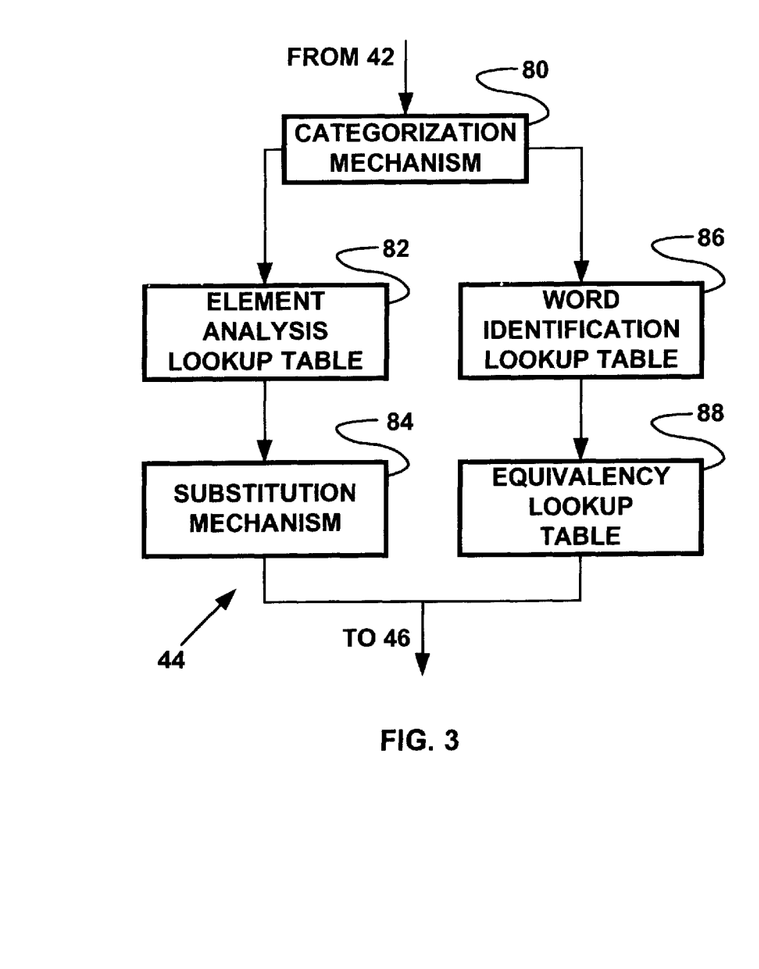
FIG. 3 is a more detailed description of a portion of the method of the present invention.

Referring now to FIG. 3, therein is shown the conversion mechanism 44 which is a typical conversion subroutine. The input is from the reference document input 42 in FIG. 2. This input is provided to a categorization mechanism 80 which is a subroutine that identifies images and text on the document. Images are inputted into an element analysis lookup table 82 which identifies each element in the image. The elements are identified by a subroutine similar to the software program called WordScan available from Calera Recognition Systems, Inc., 475 Potero Avenue, Sunnyvale, Calif., 94086-9408.

Non-standard elements are looked up on a lookup table containing configurations of various elements standard to the U.S. Patent and Trademark Office, the Institute of Electronic and Electrical Engineers (IEEE), and similar standards organizations. The unidentified elements in the image are highlighted and the imaged passed to the substitution subroutine 84 where the highlighted elements are compared again against the lookup table and the closest matching element is substituted.

The output of the substitution mechanism 84 is provided to the standardizing mechanism 46.

Text outputted from the categorization mechanism 80 is provided to a word identification lookup table 86 containing an electronic thesaurus. The text contains a word description related to the product or process. The technical descriptive words in the text is matched against a single synonym such that the numerous technical words that are used in different textual document are converted to a single common denominator synonym. The common denominator synonym is provided on equivalency lookup table 88 which converts the common denominator synonym into a text equivalent image element. Similarly, the connected words for the technical elements will be identified and the equivalency lookup table 88 provides directions for interconnecting the image elements.

An example of the foregoing are the words "lead", "connection", "interconnection", "cable", "wire", etc., which are all synonyms. The electronic thesaurus would identify the words as synonymous with "lead" which would be the single common denominator synonym outputted from the categorization mechanism 80. The equivalency lookup table 88 would convert the "lead" to an image of a "line" of one unit length. Text which indicates two elements, A and B, are connected by a "lead" results in the lookup table 86 finding the synonyms for A and B and the equivalency lookup table 88 providing an image of A connected by a one unit length image of a line to an image of B.

The output of the equivalency lookup table 88 will be an interconnected image which will be provided to the standardization mechanism 46.

Figure 4:
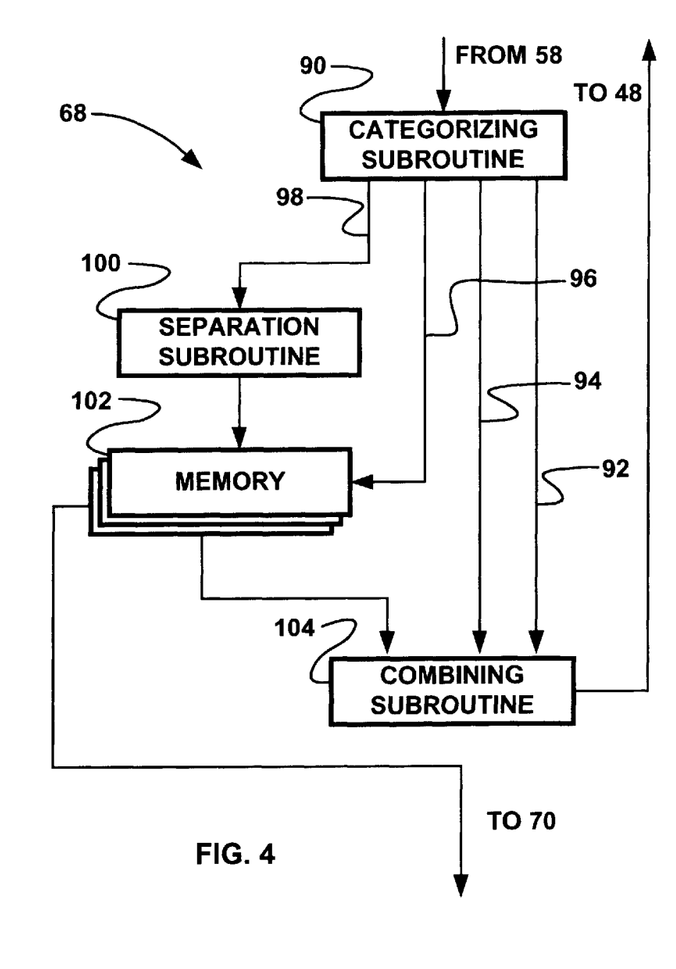
FIG. 4 is a more detailed description of another portion of the method of the present invention.

Referring now to FIG. 4, therein is shown the combining mechanism 68 which is a subroutine for taking the output of the analysis mechanism 58 which indicates a partial similarity between the reference document and searched document images. The combining mechanism 68 consists of a categorizing subroutine 90 which determines that the image from the analysis mechanism 58 is:

the first image, in which case it is outputted along a procedural line 92;

a subsequent image which has not been previously combined (as will hereafter be described), in which case it is outputted along a procedural line 94;

the last image, in which case it is outputted along a procedural line 96; or a previously combined image, in which case it is outputted along a procedural line 98.

The output along procedural line 98 is a combined image which will be separated back into its component images by the separation subroutine 100. The separated images from the separation subroutine 100 will be held in memory 102 which is outputted to a combining subroutine 104. It should be noted that the memory 102 could be modified to hold only the portions of an image previously found to be similar and could discard the dissimilar portions. The memory 102 further has an input from procedural line 96 and an output to the identification mechanism 70.

Before proceeding, it should be noted that, while the present invention is applicable to copyright, trademark, trade secret, and other areas of intellectual property work, the system 10 and the computer program 40 are optimized to provide assistance in the field of patent law and more particularly in the area of electronic and electrical patent law where there are a relatively limited number of circuit components and the interconnections generally start from a power source and end in a ground. However, it should further be noted that it would be evident to those skilled in the art how the system 10 could be applied to software, mechanical and chemical fields.

In patent law operations related to practice, the searched document database 52 may be full text and drawing patent information on CD-ROM available, for example, from Derwent Direct, 1921 Jefferson Davis Highway, Arlington, Va., 22202. Similarly, it could be taken off a number of full text electronic databases which are currently available on Internet.

In operation in the patent design around mode, a new product circuit schematic is scanned into the system 10 by the document input mechanism 12. The schematic is the reference document at the reference document input 42.

Since a circuit schematic generally is an image to begin with, the conversion in the conversion mechanism 44 is straight forward with the element analysis lookup table 82 providing an image with relatively few unknown elements to substitution mechanism 84. If desired, an operator could intervene at this point to identify unknown elements.

The reference document image is then provided to the standardizing mechanism 46 which may have very little to do since the circuit schematic may already be in conformance with the design rules that are intended to be implemented by the standardizing mechanism 46 and thus the image would be already prepared for the comparison mechanism 48.

In the patent design around mode, there is usually a problem patent which needs to be avoided, and this patent provides filing date information. In the U.S., an invalidating reference must be filed more than one year prior to the filing date of the problem patent. In other countries, it need only be filed just prior to the filing date of the problem patent. This provides a time frame for the patents and other prior art to be inserted in the database. Ideally, the database contains patents which are expired, abandoned, or unenforceable. Similarly, the searched document database 52 may contain invalidating publications and other documents which describe circuitry upon which no patents have been filed. Generally, this prior art will consist of circuit schematics which will be images processable the same way the reference document image is processed.

Thus, each of the searched documents which are input in the searched document input 50 will be converted by the conversion mechanism 54 into a recognizable image which can be standardized by the standardizing mechanism 56.

The images out of the standardizing mechanisms 46 and 56 have a uniform format or configuration which makes comparison in the comparison mechanism 48 straight forward. The results of the comparison mechanism 48 are outputted to the analysis mechanism 58.

If the output of the analysis mechanism 58 indicates that a single searched document image has been found, the output is provided to the identifying mechanism 60 which correlates the image with the original searched document to indicate which one it is so that the similarity output 68 can show the similarity and identify its source. At the same time the identifying combining mechanism 68 instructs the searched document database 52 to provide the next searched document to the searched document input 50.

Since there are often insignificant differences in analyzed images, a fuzzy logic subroutine could be used to determine which differences to ignore and when to indicate a partial similarity. If the analysis mechanism 58 indicates a partial similarity, the output is provided to the combining mechanism 68.

The categorizing subroutine 90 of the combining mechanism 68 first checks the entering image to determine whether it is the first image presented which is of partial similarity. The first image will be held until the next partial similarity is provided from the analysis mechanism 58. If the next subsequent image has not been combined with the first image, the subsequent image will be combined by the combining subroutine 104. The combining subroutine 104 in its simplest form can combine the two images side by side. In a more complex form it could combine connections to show a single completed circuit schematic image. The output of the combining subroutine 104 is provided back to the comparison mechanism 48 to see if a higher degree of similarity is achieved for the similarity output 62.

If the analysis mechanism 58 indicates that the similarity is still partial, the categorizing subroutine 90 will provide the image through the procedural line 98 to the separation subroutine 100 where the images will be separated back into the original two images and inserted into the memory 102. Subsequently (or concurrently in a multiprocessor), each partial similarity image will be combined with subsequent partial similarity images by the combining subroutine 104.

Thus, each partial similarity image will be matched with every other partial similarity image until a substantial similarity occurs in which case this appears at the similarity output 62 or no substantial similarity occurs in which case, on the last previously combined image, an output will be provided along the procedural line 96 to cause the memory 102 to output to the identification mechanism 70 and provide all the documents which have partial similarity to the partial similarity output 72. Here the similarity output 62 provides complete design around protection while the partial similarity output 72 may provide some direction for possible design arounds.

It should be noted that the combining mechanism 68 shown in FIG. 4 provides for only two partial similarity images to be combined. It is within the level of those skilled in the art to allow more partially similar images to be combined as desired.

The output at the similarity output 62 or the partial similarity output 72 could be outputted through the printer which is the document output mechanism 28. For large schematics, the document output mechanism 28 would be a schematic plotter.

While the patent design around mode describes using publicly available technology, it should be understood that if the manufacturer also has patents, those patents could also be used in the Design Around process, and in many cases be better than publicly available technology since it may relate to the specific field in which the manufacturer is concerned.

In operation in the validity/prior art search mode, the reference document is a patent application or a granted patent, and the "claims" are of particular importance. The searched documents are the drawings or graphic images of prior art patents and other references.

The reference document input 42 receives the patent application or granted patent and provides the image and text to the conversion mechanism 44.

In this mode, claims of the patent application or granted patent will be separated from the image by the categorization subroutine 80. The claims which are in text format would be provided to the word identification lookup table 86 to provide the circuit element synonyms and the interconnections to be outputted to the equivalency lookup table 88 where the words would be used in the lookup table to match with an equivalent circuit element.

The claim equivalent image is then provided to the standardizing mechanism 46 to be set up in the standard format.

The searched document input 50 receives prior art such as patent drawings and document drawings converted by the conversion mechanism 54 and standardized by the standardizing mechanism 56 as previously described.

The standardized images are then compared in the comparison mechanism 48 and analyzed in the analysis mechanism 58 as also previously described.

In this mode, the similarity output 62 provides the anticipatory references under 35 United States Code (USC) § 102 and the partial similarity output 72 provides potential 35 USC § 103 prior art.

In the validity/prior art search mode, the claims of a patent or patent application are used to locate prior art drawings which may invalidate the granted patent or prevent the issuance of the patent application.

In operation in the response to office action mode, the claims of a patent application are inputted at the reference document input 42. The claims are converted in the conversion mechanism 44 to a claim equivalent image which is standardized in the standardizing mechanism 46. In the comparison mechanism 48 the claim equivalent image is compared with patent office cited prior art which is inputted at the searched document input 50.

Generally, the cited prior art comprise patents, but in some cases they may be patent applications, or other reference documents. The conversion mechanism 54 will convert this cited prior art to images for standardization by the standardizing mechanism 62 to output a standardized format image for the comparison mechanism 48.

In this mode, the similarity output 62 will provide an indication of the validity of a 35 USC § 102 anticipatory reference, in which case it should be considered whether to modify the claims if possible or abandon the application. The output of the partial similarity output 72 produce obviousness references under 35 USC § 103 which indicate that the claims may need to be modified.

In this mode, the analysis mechanism 58 may provide an indication that there is a dissimilarity in the images outputted at the dissimilarity output 66. In this case, the cited references are not anticipatory or obviousness references. The dissimilarity output 66 provides an indication of where the application claims and the cited prior art are different and thus provides the basis for a response to the office action.

Over time, a database of office actions will be created which can be used to provide reference terminology to be used in subsequent office actions. This terminology is available at the identifying mechanisms 60, 70, or 64 to provide text language at the outputs 62, 72, or 66 to draft office actions, modifying responses, or distinguishing responses, respectively.

In the response to office action mode, the applicant's claims are tested against the cited prior art and information developed which allow a proper response to the patent office office action.

In operation in the infringement determination mode, a patent owner inputs his/her patent at the reference document input 42. Since the claims are important, the conversion mechanism 44 provides a claim equivalent image as an output to the standardizing mechanism 46.

In this mode, a potential licensees' product schematics, data sheets, manuals, etc., are entered into the searched document input 50 and the images converted if necessary in the conversion mechanism 54 to provide a standardized image out of the standardizing mechanism 56.

The output of the comparison mechanism 48 and the analysis mechanism 58 through the various identifying mechanisms 60, 70, and 64 are to the various outputs 62, 72, and 66.

The similarity output 62 identifies schematics which infringe the patent, and the dissimilarity output 66 indicates that there is no infringement. The partial similarity output 72 provides an output which needs to be evaluated by a skilled patent attorney or patent agent to determine whether or not the patent law Doctrine of Equivalents may be applicable for those devices which are partially similar.

The Doctrine of Equivalents is a court created and evolving doctrine which in the past has found patents infringed where there is no literal infringement of the claims but the alleged infringing device does substantially the same thing in substantially the same way.

In the infringement determination mode, a manufacturer who had been sued by a competitor on a patent can review the manufacturer's entire patent portfolio to determine whether or not the competitor could be neutralized. As will be evident to those skilled in the art, numerous patents could be reviewed against numerous products merely by the addition of a reference document database (not shown, as this is to those skilled in the art) inputting to the reference document input 42.

In operation in the patent drafting mode, the reference document is the invention disclosure. In this mode, the conversion mechanism 44 makes use of both the image and the text to develop both an image-based image and an text-based image for standardization in the standardizing mechanism 46.

The searched document input 50 receives patents which are inputted to the conversion mechanism 54 as the patent images to be utilized as well as the claims equivalent images to be utilized for comparison purposes by the comparison mechanism 48.

In this mode, the identifying mechanism 60 identifies the text and the claims of other patents which are similar to the invention drawing and description. In patent law practice, the text will generally describe the drawings or their mode of operation, but in other areas the text may merely be related or associated with the drawings such as a news article with a photograph. The similarity output 62 provides claim language options and descriptions similar to the invention drawing and/or description.

In the patent drafting mode, the invention disclosure is used to search patents for similar terminology which can be used to expedite the drafting of a patent application.

In the clearance search mode, the input to the reference document input 42 may be the circuit schematic for a new product. The converted and standardized image would be the same as for any circuit schematic.

The searched document to be inputted into the searched document input 50 may be granted patents and other foreign patent applications which have been published.

The conversion mechanism 54 in this mode converts the claims into claim equivalent images for the standardizing mechanism 56.

After processing through the comparison mechanism 48 and the analysis mechanism 58, the similarity output 62 provides an indication of patents which may be infringed. The partial similarity output 72 indicates possible infringements. The dissimilarity output 66 indicates no infringement.

In the clearance search mode, a new product manufacturer may be able to determine whether or not there are patents which need to be licensed in order to make, use, or sell a new product.

As will be evident to those skilled in the art, the various modes could be used to supplement each other. For example, if the infringement determination mode indicated potential infringement, the patent design around mode could be used to design around the patent. Similarly, if the validity/prior art search mode indicates that a patent was invalid or an application should not be granted, a response to office action mode could be used to modify the claims if within the relevant statutory time frame.

While the invention has been described in conjunction with a specific embodiment, it is to be understood that many alternatives, modifications, and variations would be apparent to those skilled in the art in light of the foregoing description. Accordingly, it is intended to embrace all such alternatives, modifications, and variations which fall within the spirit and scope of the intended claims and that all matters set forth herein are shown in the accompanying drawings is to be interpreted in an illustrative and not a limiting sense.

I claim:

1. Apparatus comprising:
   first means for providing an image capable of containing a first graphic image and a related text image;
   conversion means for converting said related text image into an equivalent graphic image;
   second means for providing a second graphic image;
   comparison means for comparing said equivalent graphic image and said second graphic image provided thereto; and
   output means for outputting the results of said comparison between said equivalent graphic image and said second graphic image.

2. Apparatus comprising:
   first means for providing an image capable of containing a first graphic image and a related text image;
   conversion means for converting said related text image into an equivalent graphic image;
   second means for providing a second graphic image and a third graphic image;
   combining means for combining said second graphic image with said third graphic image and providing a combined graphic image;
   comparison means for comparing said equivalent graphic image and said combined graphic image; and
   output means for outputting the results of said comparison between said equivalent graphic image and said combined graphic image.

3. Apparatus comprising:
   first means for providing a first image capable of containing a first graphic image and a related first text image;
   second means for providing a second image capable of containing a second graphic image and a related second text image;
   conversion means for converting said first and second text images into respective first and second equivalent graphic images;
   comparison means for comparing said first and second equivalent graphic images; and
   output means for outputting the results of said comparison between said first and second equivalent graphic images.

4. The apparatus as claimed in claim 1 wherein:
   said output means includes means for providing said results by showing the similarity in said graphic images.

5. The apparatus as claimed in claim 1 wherein:
   said output means includes means for providing said results by showing the dissimilarity in said graphic images.

6. The apparatus as claimed in claim 1 wherein:
   said output means includes means for providing said results by showing the partial similarity in said graphic images.

7. The apparatus as claimed in claim 3 including:
   identifying means for identifying the results of said comparison between said first and second equivalent graphic images as an equivalent text image.

8. Apparatus for the manipulation of documents comprising:
   a reference input for providing a reference document containing a first image capable of containing a first graphic image and a related text image;
   a conversion mechanism for converting said related text image into an equivalent graphic image;
   a searched input for providing a searched document containing a second graphic image;
   a comparison mechanism for comparing said equivalent graphic image to said second graphic image; and
   an output for outputting the results of said comparison between said reference document and said searched document.

9. Apparatus for the manipulation of documents comprising:
   a reference input for providing a reference document containing an image capable of containing a first graphic image and a related text image;
   a conversion mechanism for converting said related text image into an equivalent graphic image;
   a searched input for providing a first searched document containing a second graphic image;
   said searched input including a database for providing a second searched document containing a third graphic image;
   a comparison mechanism configured to compare said first graphic image with said second graphic image and identifying similarities therebetween;
   said comparison mechanism configured to compare said first graphic image with said third graphic image and for identifying similarities therebetween;
   a combining mechanism for combining the identified similarities in said second graphic image and said third graphic image to provide a combined graphic image;
   said comparison mechanism configured to compare said first graphic image with said combined graphic image; and
   an output for outputting the results of said comparison between said reference document and said searched documents.

10. A system for the manipulation of documents capable of containing graphic images and text images, comprising:
    a reference document input device for inputting a reference document containing a first image capable of containing a first graphic image and a related first text image;
    a searched document input device for inputting a document to be searched containing a second image capable of containing a second graphic image and a second related text image;
    a processing mechanism containing a first mechanism for converting said related first and second text images into respective first and second equivalent graphic images;
    said processing mechanism containing a second mechanism for comparing said first and second equivalent graphic images and said first and second graphic images, and identifying similarities therebetween; and
    an output device for outputting the results of said comparison between said graphic images.

11. The apparatus as claimed in claim 8 wherein:
    said output device includes a mechanism for providing said results by showing the similarity in said documents.

12. The apparatus as claimed in claim 8 wherein:

said output device includes a mechanism for providing said results by showing the dissimilarity in said documents.

13. The apparatus as claimed in claim 8 wherein:

said output device includes a mechanism for providing said results by showing the partial similarity in said documents.

14. The apparatus as claimed in claim 10 including:

an identifying mechanism for identifying the results of said comparison between said first and second equivalent graphic images as an equivalent text image and between said first and second graphic images as a further graphic image.

15. A system for the manipulation of documents capable of containing graphic images and text images, comprising:

a reference document input device for inputting a reference document containing a first image capable of containing a first graphic image in a first format and a text description of said first graphic image;

a searched document input device for inputting a plurality of documents to be searched containing a plurality of images capable of containing a plurality of graphic images in a plurality of formats with a plurality of respectively related text descriptions;

a processing unit containing a first unit for converting said first graphic image in said first format and said plurality of graphic images in said plurality of formats into a standard format;

said processing unit containing a second unit for converting said plurality of text descriptions into a plurality of equivalent graphic images respectively related to said first graphic image and said plurality of graphic images;

said processing unit containing a third unit for converting said plurality of equivalent graphic images into said standard format;

said processing unit containing a fifth unit for combining the similarities in said plurality of graphic images in different combinations;

said processing unit containing a sixth unit for comparing said first graphic image with the different combinations of said plurality of graphic images to identify the closest similarity between said first graphic image and said plurality of said graphic images and said combination of said plurality of said graphic images; and an output device for identifying the single and combination of searched documents which are substantially similar and partially similar to said reference document.

16. A method for manipulating images comprising the steps of:

providing an image capable of containing a first graphic image and a related text image;

converting said related text image into an equivalent graphic image;

providing a second graphic image;

comparing said equivalent graphic image and said second graphic image; and outputting the results of said comparison between said equivalent graphic image and said graphic second image.

17. A method for manipulating images comprising the steps of:

providing an image capable of containing a first graphic image and a related text image;

converting said related text image into an equivalent graphic image;

providing a second graphic image;

providing a third graphic image;

combining said second graphic image with said third graphic image to provide a combined graphic image;

comparing said equivalent graphic image and said combined graphic image; and outputting the results of said comparison.

18. A method for manipulating images comprising the steps of:

providing a first image capable of containing a first graphic image and a related first text image;

providing a second image capable of containing a second graphic image and a related second text image;

converting said related first and second text images into respective first and second equivalent graphic images;

comparing said first and second equivalent graphic; and outputting the results of said comparison between said first and second equivalent graphic images.

19. The method as claimed in claim 16 including the step of:

providing said results by showing the similarity in said graphic images.

20. The method as claimed in claim 16 including the step of:

providing said results by showing the dissimilarity in said graphic images.

21. The method as claimed in claim 16 including the step of:

providing said results by showing the partial similarity in said graphic images.

22. The method as claimed in claim 18 including the step of:

identifying the results of said comparison between said first and second equivalent graphic images as an equivalent text image.

23. A method for the manipulation of documents comprising the steps of:

providing a reference document containing a first image capable of containing a first graphic image and a related text image;

converting said related text image into an equivalent graphic image;

providing a searched document containing a second graphic image;

comparing said equivalent graphic image and said second graphic image; and outputting the results of said comparison between said reference document and said searched document images.

24. A method for the manipulation of documents comprising the steps of:

providing a reference document containing an image capable of containing a first graphic image and a related text image;

converting said related text image into an equivalent graphic image;

providing a first searched document containing a second graphic image;

providing a second searched document containing a third graphic image;

comparing said equivalent graphic image and said second graphic image and identifying similarities therebetween;

comparing said equivalent graphic image and said third graphic image and identifying similarities therebetween;

combining the identified similarities in said second graphic image and said third graphic image to provide a combined graphic image;

comparing said equivalent graphic image and said combined graphic image; and outputting the results of said comparison between said reference document and said searched documents.

25. A method for the manipulation of documents capable of containing graphic images and text images, comprising the steps of:

inputting a reference document capable of containing a first graphic image and a first text description related to said first graphic image;

inputting a document to be searched capable of containing a second graphic image and a second text description related to said second graphic image;

converting the text description related to one of said graphic images to be an equivalent graphic image;

comparing said equivalent graphic image and the other of said graphic images, and identifying similarities therebetween; and outputting the results of said comparison between text description and said other of said graphic images.

26. The method as claimed in claim 23 including the step of:

providing said results by showing the similarity in said documents.

27. The method as claimed in claim 23 including the step of:

providing said results by showing the dissimilarity in said documents.

28. The method as claimed in claim 23 including the step of:

providing said results by showing the partial similarity in said documents.

29. The method as claimed in claim 25 including the step of:

identifying the results of said comparison between said equivalent graphic image and the other of said graphic images as an equivalent text image.

30. A method for the manipulation of documents capable of containing graphic images and text images, comprising the steps of:

inputting a reference document containing a first graphic image in a first format and a text description of said first graphic image;

inputting a plurality of documents to be searched containing a plurality of graphic images in a plurality of formats with a plurality of respectively related text descriptions;

converting said first graphic image in said first format and said plurality of graphic images in said plurality of formats into a standard format;

converting said plurality of respectively related text descriptions into a plurality of equivalent graphic images respectively related to said first graphic image and said plurality of graphic images;

converting said plurality of equivalent graphic images into said standard format;

comparing said first graphic image with said plurality of graphic images and identifying similarities between said first graphic image and said plurality of graphic images as similar graphic images;

combining said similar graphic images in different combinations;

comparing said first graphic image with said similar graphic images in different combinations to identify the closest similarity between said first graphic image and said similar graphic images; and identifying the single and combination of searched documents which are substantially similar and partially similar to said reference document.

31. The apparatus as claimed in claim 1, wherein said conversion means includes an equivalency lookup table for matching and converting a descriptive word in said related text image into a graphic image equivalent to said descriptive word.

32. The apparatus as claimed in claim 31, wherein said conversion means includes an electronic thesaurus for matching and converting said descriptive word in said related text image into a synonym.

33. A method for the electronic manipulation of patent documents comprising the steps of:

providing a reference patent document capable of containing a first patent drawing and a first text related to said first patent drawing;

providing a searched patent document capable of containing a second patent drawing and a second text related to said second patent drawing;

converting the text related to one of said patent documents to be an equivalent graphic image;

comparing said equivalent graphic image and the other of said patent drawings, and identifying similarities therebetween; and outputting the results of said comparison between the equivalent graphic image and said other of said patent drawings whereby a similarity between said reference patent document equivalent graphic image and said searched patent document drawing indicates a potential invalidity of said reference patent document and a similarity between said reference patent document drawing and said searched patent document equivalent graphic image indicates a possible infringement of said searched patent document.

34. The method for the electronic manipulation of patent documents as claimed in claim 33 wherein the step of:

providing said reference patent document provides an invention disclosure document.

35. The method for the electronic manipulation of patent documents as claimed in claim 33 wherein the step of:

providing said reference patent document provides a patent application document.

36. The method for the electronic manipulation of patent documents as claimed in claim 33 wherein the step of:

converting the text related to one of said patent documents to be an equivalent graphic image includes converting said first patent drawing to be in said equivalent graphic image.

37. The method for the electronic manipulation of patent documents as claimed in claim 33 including the step of:

converting said equivalent graphic image and the other of said patent drawings to the same format before said comparing step.

38. The method for the electronic manipulation of patent documents as claimed in claim 33 wherein said steps of:

providing a reference patent document provides a reference patent document containing a first text including a claim; and providing a searched patent document provides a searched patent document containing a second text including a claim.

39. A method for the electronic manipulation of patent documents comprising the steps of:

providing a reference patent document capable of containing a first patent drawing and related text;

converting said related text into an equivalent graphic image;

providing a first searched patent document containing a second patent drawing;

providing a second searched patent document containing a third patent drawing;

comparing said equivalent graphic image and said second patent drawing and identifying similarities therebetween;

comparing said equivalent graphic image and said third patent drawing and identifying similarities therebetween;

combining the identified similarities in said second patent drawing and said third patent drawing to provide a combined graphic image;

comparing said equivalent graphic image and said combined graphic image; and outputting the results of said comparison between said reference patent document and said searched patent documents whereby a similarity indicates potential obviousness of the reference patent document in view of the searched patent documents and a dissimilarity indicates potential unobviousness of the reference patent document in view of the searched patent documents.

40. The method for the electronic manipulation of patent documents as claimed in claim 39 wherein the step of:

providing said reference patent document provides an invention disclosure document.

41. The method for the electronic manipulation of patent documents as claimed in claim 39 wherein the step of:

providing said reference patent document provides a patent application document.

42. The method for the electronic manipulation of patent documents as claimed in claim 39 wherein said step of:

providing a reference patent document provides a reference patent document containing a related text including a claim.

43. The method for the electronic manipulation of patent documents as claimed in claim 39 wherein said step of:

converting the text related to one of said patent documents to be an equivalent graphic image includes converting said first patent drawing to be an equivalent graphic image.

44. The method for the electronic manipulation of patent documents as claimed in claim 39 including the step of:

converting said equivalent graphic image and said first and second patent drawings to the same format before said comparing step.

45. A method for the electronic manipulation of patent documents comprising the steps of:

providing a reference patent document capable of containing a first patent drawing and a related text;

converting said first patent drawing and said related text into an equivalent graphic image;

providing a first searched patent document containing a second patent drawing and a second related text;

providing a second searched patent document containing a third patent drawing and a third related text;

comparing said equivalent graphic image and said second patent drawing and identifying similarities therebetween;

comparing said equivalent graphic image and said third patent drawing and identifying similarities therebetween;

combining the identified similarities in said second patent drawing and said third patent drawing to provide a combined graphic image;

combining the second related text and the first related text to provide a combined text; and outputting the results of said combining steps whereby a combined patent document is created having said combined graphic image and said combined text.

46. The method for the electronic manipulation of patent documents as claimed in claim 45 wherein the step of:

providing said reference patent document provides an invention disclosure document.

47. The method for the electronic manipulation of patent documents as claimed in claim 45 wherein the step of:

providing said reference patent document provides a patent application document.

48. The method for the electronic manipulation of patent documents as claimed in claim 45 wherein said step of:

providing a reference patent document provides a reference patent document containing a related text including a claim.

49. The method for the electronic manipulation of patent documents as claimed in claim 45 wherein the step of:

converting the text related to one of said patent documents to be an equivalent graphic image includes converting said first patent drawing to be in an equivalent graphic image to be compared with said second and third patent drawings.

50. The method for the electronic manipulation of patent documents as claimed in claim 45 including the step of:

converting said equivalent graphic image and said first and second patent drawings to the same format before said comparing step.

51. The method for the electronic manipulation of patent documents as claimed in claim 45 wherein the step of:

converting the text related to one of said patent documents to be an equivalent graphic image includes converting said first patent drawing to be an equivalent graphic image to be compared in said comparing step.

52. The method for the electronic manipulation of patent documents as claimed in claim 45 wherein said steps of:

providing a reference patent document provides a reference patent document containing a related text including a claim;

providing a first searched patent document provides a second related text including a claim;

providing a second searched patent document provides a third related text including a claim; and combining the second related text and the first related text to provide a combined text including a claim.

* * * * *